United States Patent
Tamaki

(10) Patent No.: US 8,010,517 B2
(45) Date of Patent: Aug. 30, 2011

(54) APPARATUS, METHOD AND SYSTEM FOR TABULATION PROCESSING, AND RECORDING MEDIUM

(75) Inventor: Kenichi Tamaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 444 days.

(21) Appl. No.: 11/424,023

(22) Filed: Jun. 14, 2006

(65) Prior Publication Data
US 2007/0226215 A1 Sep. 27, 2007

(30) Foreign Application Priority Data
Mar. 24, 2006 (JP) .................. 2006-083552

(51) Int. Cl.
*G06F 7/00* (2006.01)
(52) U.S. Cl. ........ 707/705; 707/694; 707/713; 707/722; 709/201; 715/200; 715/700
(58) Field of Classification Search .................. 707/705, 707/713, 722, 694
See application file for complete search history.

(56) References Cited

U.S. PATENT DOCUMENTS

| | | | |
|---|---|---|---|
| 6,526,257 B2 | 2/2003 | Doi et al. | |
| 7,133,834 B1 * | 11/2006 | Abelow | 705/10 |
| 2001/0052009 A1 * | 12/2001 | Desai et al. | 709/224 |
| 2001/0053514 A1 | 12/2001 | Doi et al. | |
| 2003/0112959 A1 | 6/2003 | Mori | |
| 2005/0089834 A1 * | 4/2005 | Shapiro | 434/323 |

FOREIGN PATENT DOCUMENTS

| | | |
|---|---|---|
| JP | 2001-136858 | 5/2001 |
| JP | 2002-007452 A | 1/2002 |
| JP | 2002-329056 A | 11/2002 |
| JP | 2003-186977 | 7/2003 |
| JP | 2003-242337 A | 8/2003 |
| JP | 2004-126969 A | 4/2004 |
| JP | 2005-181442 A | 7/2005 |

OTHER PUBLICATIONS

Japanese Notification of Reasons for Refusal, Partial English-language translation, mailed Nov. 30, 2010 for corresponding Japanese Application No. 2006-083552.

* cited by examiner

*Primary Examiner* — Wilson Lee
*Assistant Examiner* — Tuan-Khanh Phan
(74) *Attorney, Agent, or Firm* — Fujitsu Patent Center

(57) ABSTRACT

The present invention is intended to acquire a tabulation result corresponding to changes in questions based on the knowledge that question contents are changed as time advances from a point of generation of a cause of the question and to acquire a tabulation result corresponding to questions issued from customers with question contents changing as time advances from a point of purchase of equipments, etc. Solution information for questions from customers is provided by forming a question group consisting of questions based on purchase of equipments, etc., by using the question group to tabulate the questions for each elapsed time period from a point of a cause of the question to a point of generation of the question, and by ranking the questions from the tabulation result.

20 Claims, 22 Drawing Sheets

| CUSTOMER ID | MODEL ID | CUSTOMER REGISTRATION DATE |
|---|---|---|
| 11325 | 1 | 2005/4/1 |
| 2563 | 2 | 2005/4/10 |
| ⋮ | ⋮ | ⋮ |

| CUSTOMER ID | QUESTION CONTENT | QUESTION DATE |
|---|---|---|
| 11325 | TEACH ME HOW TO USE PERSONAL COMPUTER | 2005/4/3 |
| 11325 | TEACH ME HOW TO USE PRINTER | 2005/4/9 |
| ⋮ | ⋮ | ⋮ |

| MODEL ID | MODEL NAME | MARKETING PERIOD | CPU | HDD CAPACITY |
|---|---|---|---|---|
| 1 | FMVCE50M5 | RELEASED IN APRIL 2004 | | |
| 2 | FMVT70MN | RELEASED IN APRIL 2004 | | |
| ⋮ | ⋮ | ⋮ | ⋮ | ⋮ |

APPARATUS, METHOD AND SYSTEM FOR TABULATION PROCESSING, AND RECORDING MEDIUM

CROSS-REFERENCE TO RELATED APPLICATIONS

This application is based upon and claims the benefit of priority from the prior Japanese Patent Application No. 2006-83552, filed on Mar. 24, 2006, the entire contents of which are incorporated herein by reference.

BACKGROUND OF THE INVENTION

1. Field of the Invention

The present invention relates generally to a tabulation system for questions from personal computer purchasers, etc., and more particularly, to a tabulation processing apparatus, tabulation processing method, computer readable recording medium having a tabulation processing program, and tabulation processing system that tabulate and display the questions depending on an elapsed period.

2. Description of the Related Art

With regard to questions about operations, problems, etc. from personal computer purchasers, etc., a system has been provided for accepting the questions at a call center established by a manufacturer and presenting coping methods corresponding to the questions from the call center.

With regard to such a question process, Japanese Patent Application Laid-Open Publication No. 2003-186977 discloses a call acceptance system that includes a server for registering question examples and answer examples prepared in advance to a database to display noteworthy information on a display apparatus of an operator terminal through this server. Japanese Patent Application Laid-Open Publication No. 2001-136858 is related to pet ownership and discloses a guidance system where a purchaser is provided with CD-ROM storing computer software for network connection and pet-raising guidance software to obtain answers for questions about know-how necessary for raising pets, growth states, problem occurrences, etc. through the medium of this CD-ROM over the Internet.

By the way, since questions from customers include wide variety of topics, responding individually to each question is not necessarily an optimum service. From such a viewpoint, the questions are categorized by content to tabulate and, for example, top 10 questions are published on a call center site in a ranking format. The customers can check the contents on the computer through the Internet and, for example, as shown in FIG. 20, in question ranking display, "frequently asked questions" are displayed with display items of:

> "1. I cannot write into DVD-R/RW, DVD+R/RW.
> ... Please teach me how to deal with the problem.
> 2. Teach me about user registration.
> ... Please teach me about registration.
> ......
> 10. ....... ", etc.

When generating such a ranking format, for example, as shown in FIG. 21: all the questions from the customers for a month are collected from a question log recording the questions to create a question list (step S101); higher orders of the question list are analyzed to create a higher-order list (step S102); the higher-order list of the questions is correlated with Q&A contents (step S103); the Q&A contents corresponding to the higher-order list are correlated with a ranking table (step S104); and this ranking table is displayed as top 10 questions of that month, for example, on a Q&A navi (step S105).

FIG. 22 shows a chart of this procedure. In this case, in a timer series of one month, two months, three months, and four months after a marketing period announcement, 502 is a customer group of initial purchase; 504 is the process thereof; 506 is a customer group of one-month delayed purchase; 508 is a process after two months; 410 is a customer group of two-month delayed purchase; and 512, 514, and 516 are top 10 ranking display after three months. In the process 508, a tabulation process is performed for totalizing the customer groups 502, 506.

In such tabulation and display forms, questions immediately after the purchase and questions after a time has elapsed from the purchase are mixed in the same ranking and, in FIG. 22, the customer group of initial purchase 502 and the customer group of one-month delayed purchase 506 are added, analyzed, and tabulated with no distinction in the analysis and tabulation after two months. That is, although question contents are varied between the customers immediately after purchase and the customer after a time has elapsed from the purchase depending on the elapsed time and the learning level, if such factors are not reflected in the ranking display, it is disadvantageous for some customers that their questions are out of the ranking and expected information cannot be acquired. It is also disadvantageous that some customer may feel uneasy because their question contents are considerably different from the ranking.

Japanese Patent Application Laid-Open Publication Nos. 2003-186977 and 2001-136858 do not disclose or indicate such problems and do not disclose or include means for solving the problems.

SUMMARY OF THE INVENTION

An object of the present invention is to acquire a tabulation result corresponding to changes in questions based on the knowledge that the question contents are changed as time advances from a point of generation of a cause of the question.

Another object of the present invention is to acquire a tabulation result corresponding to questions issued from customers with question contents changing as time advances from a point of purchase of equipments, etc.

The above objects are achieved in the present invention by forming a question group consisting of questions based on purchase of equipments, etc., by using the question group to tabulate the questions for each elapsed time period from a point of a cause of the question to a point of generation of the question, and by ranking the questions from the tabulation result to provide solution information for the questions from the customers.

In order to achieve the above objects, according to a first aspect of the present invention there is provided a tabulation processing apparatus that tabulates and ranks a plurality of questions, comprising a question storing unit that stores a question group constituted by a plurality of questions; and a processing unit that extracts questions from the question group in the question storing unit for each elapsed time period from a reference time point of the questions to a generation time point thereof to create a question list, the processing unit classifying and ranking the questions from the question list.

In the tabulation processing apparatus, the processing unit may extract the questions from the question group depending on customers to create the question list.

Preferably, the processing unit outputs ranking information with the use of a difference from the generation time point of the question based on the input of the reference time point.

Preferably, the tabulation processing apparatus comprises a reference information storing unit that stores reference information referred for the ranking, wherein the processing unit refers to the reference information of the reference information storing unit to perform the ranking.

To achieve the above objects, according to a second aspect of the present invention there is provided a tabulation processing method that tabulates and ranks a plurality of questions, comprising the steps of extracting questions from a question group constituted by a plurality of questions for each elapsed time period from a reference time point of the questions to a generation time point thereof to create a question list; and classifying and ranking the questions from the question list.

Preferably, the tabulation processing method comprises the step of creating the question group from a plurality of questions.

The tabulation processing method may comprise the step of extracting the questions from the question group depending on customers to create the question list.

The tabulation processing method may comprise the step of outputting ranking information with the use of a difference from the generation time point of the question based on the input of the reference time point.

To achieve the above objects, according to a third aspect of the present invention there is provided a computer readable recording medium having a tabulation processing program executable by a computer to tabulate and rank a plurality of questions embodied therein, the program comprising the steps of extracting questions from a question group constituted by a plurality of questions for each elapsed time period from a reference time point of the questions to a generation time point thereof to create a question list; and classifying and ranking the questions from the question list.

In the computer readable recording medium, the tabulation processing program may comprise the step of creating the question group from a plurality of questions.

In the computer readable recording medium, the tabulation processing program may comprise the step of extracting the questions from the question group depending on customers to create the question list.

Preferably, the tabulation processing program comprises the step of outputting information representing the ranking based on the input of the reference time point and the generation time point.

To achieve the above objects, according to a fourth aspect of the present invention there is provided a tabulation processing system that tabulates and ranks a plurality of questions, comprising a processing apparatus that extracts questions from the question group constituted by a plurality of questions for each elapsed time period from a reference time point of the questions to a generation time point thereof to create a question list, the processing apparatus performing processes for classifying and ranking the questions from the question list; and an information output terminal that is connected to the processing apparatus, the information output terminal outputting information representing the ranking.

Preferably, the processing apparatus inputs the reference time point from the information output terminal and outputs ranking information to the information output terminal with the use of a difference from a generation time point of the question.

Preferably, the processing apparatus comprises a storing unit that stores a question group constituted by a plurality of questions.

The tabulation processing system may comprise a reference information storing unit that stores reference information referred for the ranking, wherein the processing apparatus refers to the reference information of the reference information storing unit to perform the ranking.

The features and advantages of the present invention are listed as follows.

(1) A tabulation result can be provided correspondingly to the fact that question contents are changed as time advances from a time point of generation of a cause of the question (an event). Useful solution information can be provided for questions.

(2) Solution information can be rapidly and accurately browsed in a question tabulation result for questions from an information processing terminals.

BRIEF DESCRIPTION OF THE DRAWINGS

The above and other objects, features, and advantages of the present invention will become more apparent from the following detailed description of the preferred embodiments when taken in conjunction with the accompanying drawings, in which:

FIG. 5 shows an example of the owned model table;

FIG. 7 shows an example of the question table;

FIG. 9 shows an example of the marketing period table;

DESCRIPTION OF THE PREFERRED EMBODIMENTS

First Embodiment

Figure 1:
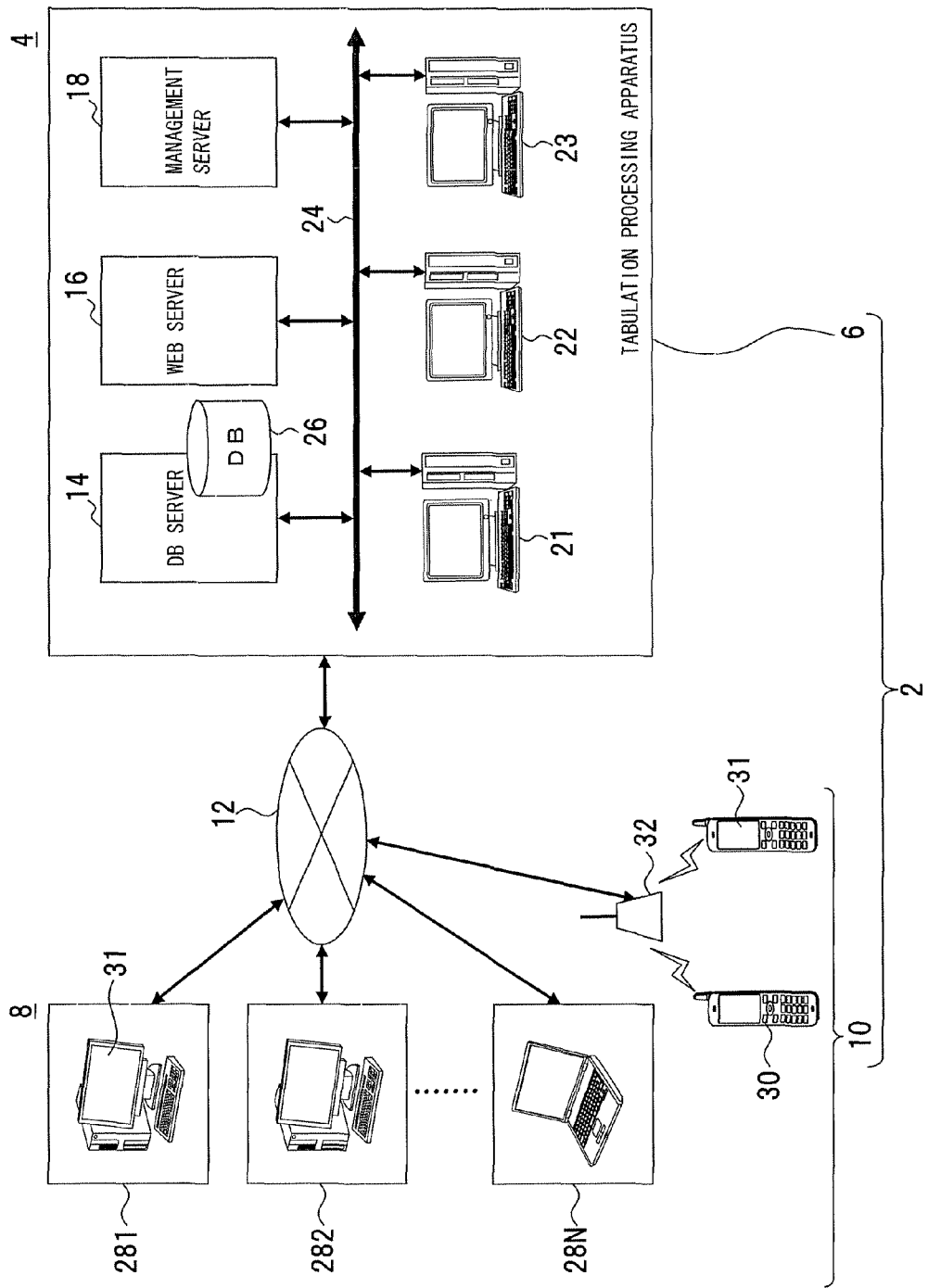
FIG. 1 shows a tabulation processing system according to a first embodiment.
Figure 2:
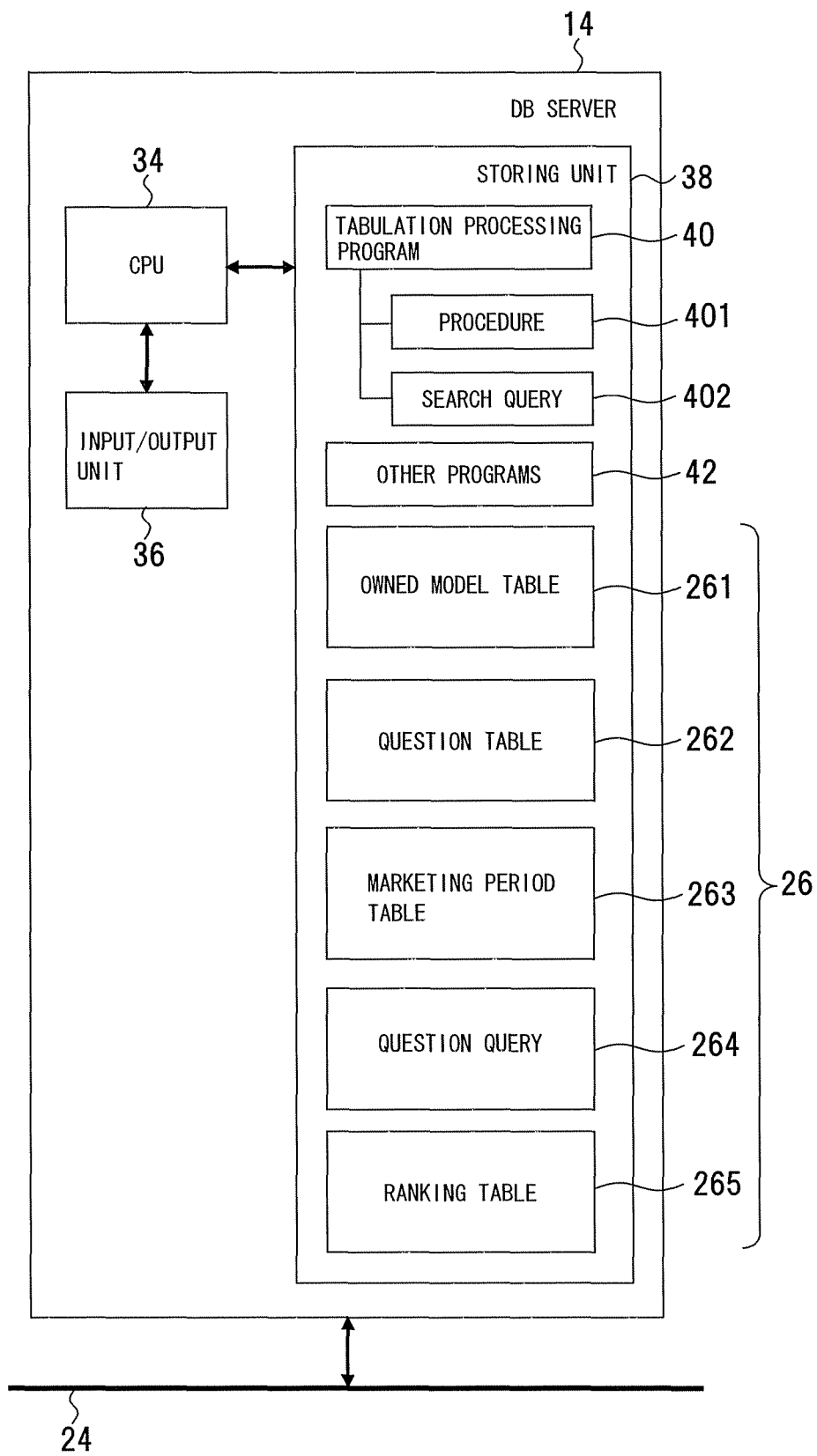
FIG. 2 shows an outline of a database server.
Figure 3:
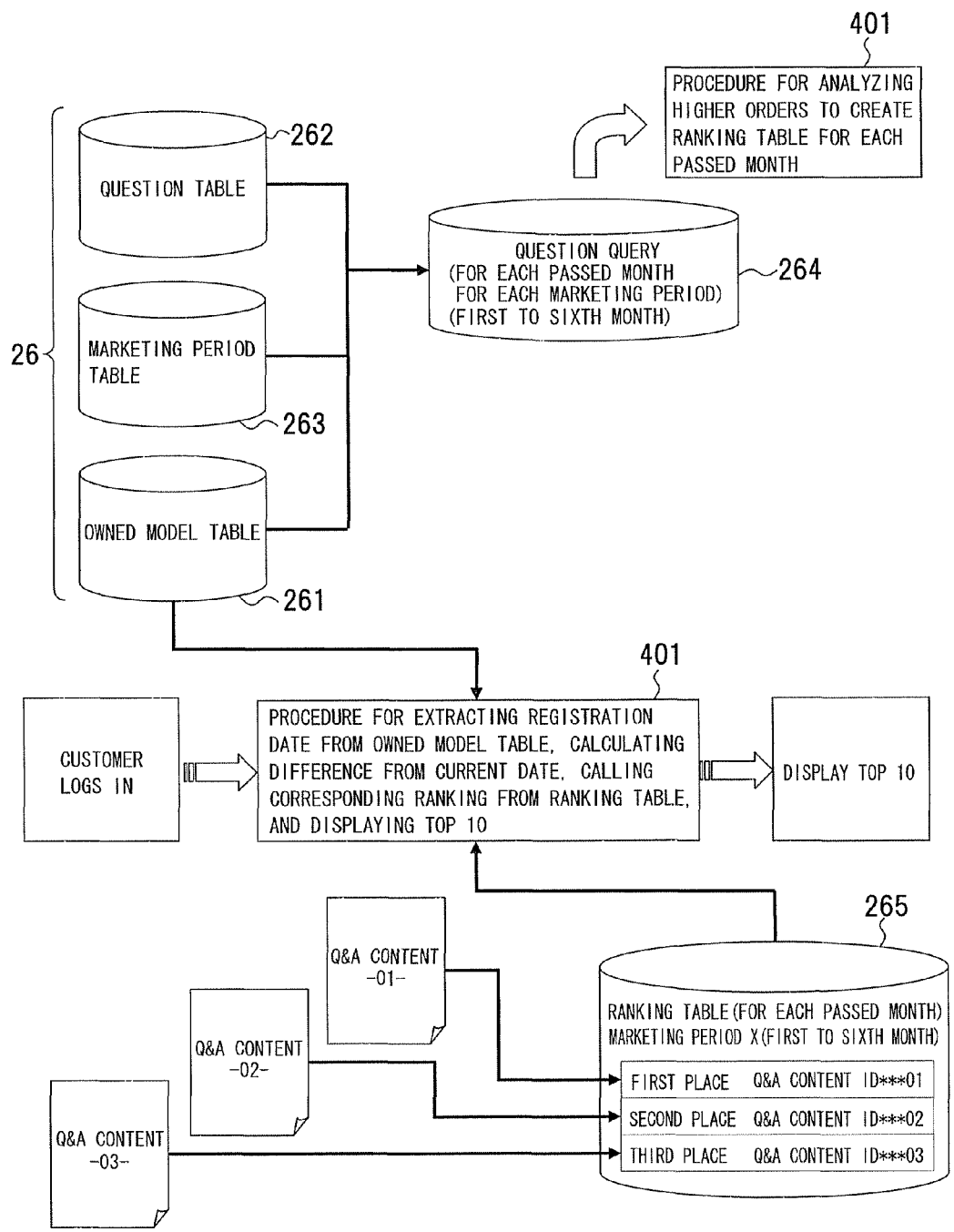
FIG. 3 shows processing contents of the tabulation processing system.

A first embodiment of the present invention will be described with reference to FIGS. 1, 2, and 3. FIG. 1 shows a tabulation processing system according to the first embodiment; FIG. 2 shows an outline of a database server; and FIG. 3 shows processing contents of the tabulation processing system.

For example, this tabulation processing system 2 connects a tabulation processing apparatus 6 in a call center 4 and information processing terminals 10 of customers 8 through network 12, performs a tabulation process of questions from the customers 8 with the tabulation processing apparatus 6, and provides the processing terminals 10 of the customers 8 with the tabulation result. In this embodiment, the customers 8 are purchasers of products and the purchased products are equipments such as personal computers. Questions from the customers 8 relate to a handling method, troubles, etc. of the equipments purchased by the customers 8. Such questions are tabulated in the call center 4; the tabulation result is presented to the customers 8 relating to the questions; and the customers 8 acquire solution information for the questions accurately and rapidly.

The tabulation processing system 2 performs a slide tabulation process by elapsed times, a ranking display process, etc. In general terms, the slide tabulation process by elapsed times is a process for sorting and tabulating questions from customers after short elapsed time from a time point of the equipment purchase and questions from customers after some elapsed time with the use of a difference between a customer registration date and a question date. The ranking display process is a process for acquiring a customer registration date from a database (DB) 26 (owned model table 261) based on access to the tabulation processing apparatus 6 from the customers 8, calculating elapsed time that is a difference between the customer registration date and a current date, and displaying the ranking corresponding to the elapsed time.

The tabulation processing apparatus 6 disposed in the call center 4 is constituted by computers that tabulate the questions from the customer 8 and, in this embodiment, includes a database (hereinafter, "DB") server 14, a web (World Wide Web) server 16, a management server 18, and information processing terminals 21, 22, 23, which are connected to a bus 24 and network 12. The network 12 is public network such as Internet. In the DB server 14, the DB 26 is constructed for storing various programs such as a tabulation processing program 40 (FIG. 2), question information, etc. The web server 16 communicates with the network 12 to give and receive information, and the management server 18 manages the entire system.

The information processing terminal 10 disposed on the customer 8 side is constituted by a single or plurality of personal computers (PC) 281, 282, ... 28N, portable terminal device 30, etc. The portable terminal device 30 is connected through radio signals such as electric waves to a base station 32 connected to the network 12. The tabulation result obtained by the tabulation processing apparatus 6 is output to the customer 8 side through the network 12 and is displayed on displaying units 31 of the PC 281 to 28N and the portable terminal device 30.

In such a tabulation processing system 2, the questions sent from the customers 8 to the call center 4 are formed into a database by the information processing terminals 21 to 23 and stored in the DB 26. By executing the tabulation processing program 40, each question is classified depending on elapsed time from a time point of equipment purchase to create a question list for each elapsed time, and this question list is analyzed to create a higher-order list by passed month, which is subjected to a ranking process. When accessing to the tabulation processing apparatus 6 through the network 12, the customer 8 can receive the process result correspondingly to the elapsed time from the time point of the equipment purchase of the customer 8 with the information processing terminal 10. In other words, for the question from the customer 8, the management server 18 transmits information corresponding to the elapsed time from the time point of the equipment purchase to the customer 8, and the customer 8 can receive information corresponding to the time and the learning level relevant to the purchased equipment.

As shown in FIG. 2, the DB server 14 is constituted by a CPU (Central Processing Unit) 34, an input/output unit 36, a storing unit 38, etc., and the storing unit 38 for which various recording media are used includes the tabulation processing program 40, various programs 42, and the DB 26 that is constituted by the owned model table 261, a question table 262, a marketing period table 263, a question query 264, a ranking table 265, etc. The tabulation processing program 40 includes a procedure 401, a search query 402, etc. The procedure 401 is a processing procedure of various instructions to the tabulation processing program 40, and the search query 402 is a processing request. The owned model table 261 stores information about correlated customers and models such as customer names, customer ID, purchase dates, and customer registration dates, and a sampling field is set in the table. The question table 262 is a storage region for storing question information and stores the question information correlated with customer information representing the customer 8. The marketing period table 263 stores information about a model sold at a sale scheduled periodically. The question query 264 stores the question information of each passed month for each marketing period, for example. The ranking table 265 stores the ranking information of each passed month, for example.

In such a configuration, by activating the tabulation processing program 40 stored in the DB server 14, various processing can be performed for creating the question list, tabulating questions correspondingly to the elapsed time from the time point of the equipment purchase or registration date, determining the ranking, etc.

In this case, the tabulation processing program 40 may be installed in the management server 18 rather than the DB server 14 and may be installed in the information processing terminal 21 to 23 if the information processing terminal 21 to 23 is disposed in the management system of the call center 4.

As shown in FIG. 3, in the tabulation processing system 2, the question query 264 is formed from the storage information of the owned model table 261, the question table 262, and the marketing period table 263 of the DB 26. In this case, by activating the tabulation processing program 40, the sampled customer ID and the registration date are extracted from the owned model table 261; the question of the sampled customer and the question date are extracted from the question table 262; a difference is calculated between the question date and the registration date; and the question query 264 stores the question information of, for example, one to six months, where the questions corresponding to the difference are classified for each passed month and organized for each marketing period. Higher orders of the passed-month question information of each marketing period are analyzed and added with the ranking for each passed month by the procedure 401 to form the ranking table 265.

The customer 8 logs into the tabulation processing apparatus 6 from the information processing terminal 10 and uses the procedure 401 to extract the registration date from the owned model table 261; a difference is calculated between the registration date and the question date; for example, display information representing top 10 is output from the ranking table 265 corresponding to the difference; and the top 10 are displayed on the information processing terminal 10.

For example, the ranking table 265 stores the ranking information of each passed month; each question is classified and correlated with classifying items, for example, "Q&A content 01", "Q&A content 02", "Q&A content 03", etc.; and the ranking table 265 stores the ranking information corresponding to the amounts thereof, for example, "first place, Q&A content ID*01", "second place, Q&A content ID*02", "third place, Q&A content ID***03", etc. In this case, the ranking information is ranking information for each passed month for one to six months.

Description will be made of the operation of the tabulation processing system.

(1) Data Generation in Owned Model Table 261

Figure 4:
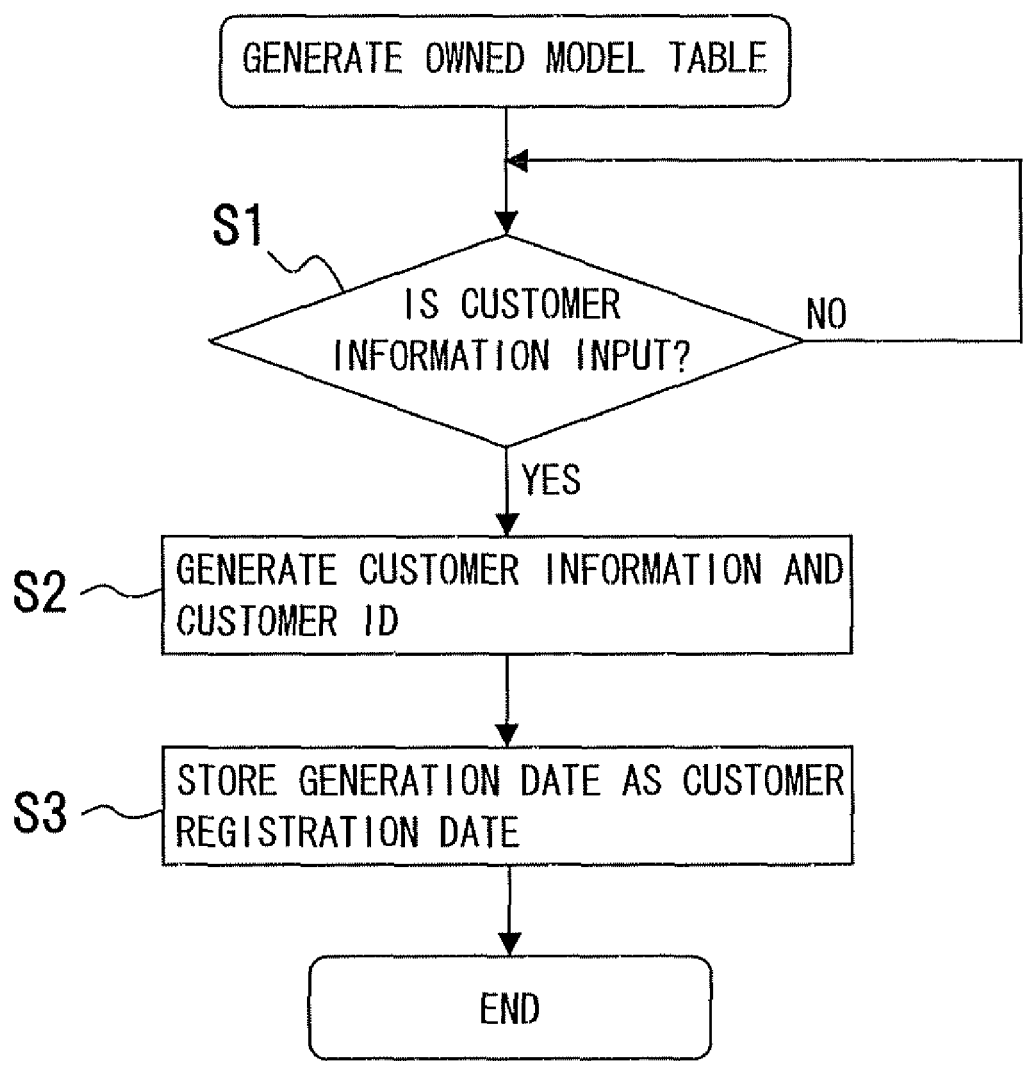
FIG. 4 is a flowchart of a processing procedure of a generation process of an owned model table.

Description will be made of the data generation in the owned model table 261 with reference to FIGS. 4 and 5. FIG. 4 is a flowchart of a processing procedure of a generation process of the owned model table 261 and FIG. 5 shows a configuration example of the owned model table 261.

Input of customer information from the information processing terminal 21 to 23 triggers the owned model table 261 to generate the customer information and the customer ID (IDentification) that is customer identification information and to store the generation date (the time and/or day) thereof as a customer registration date. Model ID is identification information that represents a model of the purchased equipments.

In this generation process, as shown in FIG. 4, it is monitored whether the customer information is input or not (step S1), and if the customer information is input (YES at step S1), the customer information and the customer ID are generated (step S2) and the generation date thereof is stored as the customer registration date (step S3). With this process, the owned model table 261 is generated.

As shown in an example of FIG. 5, the customer ID, the model ID, and the customer registration date are registered in the owned model table 261.

(2) Data Generation in Question Table 262

Figure 6:
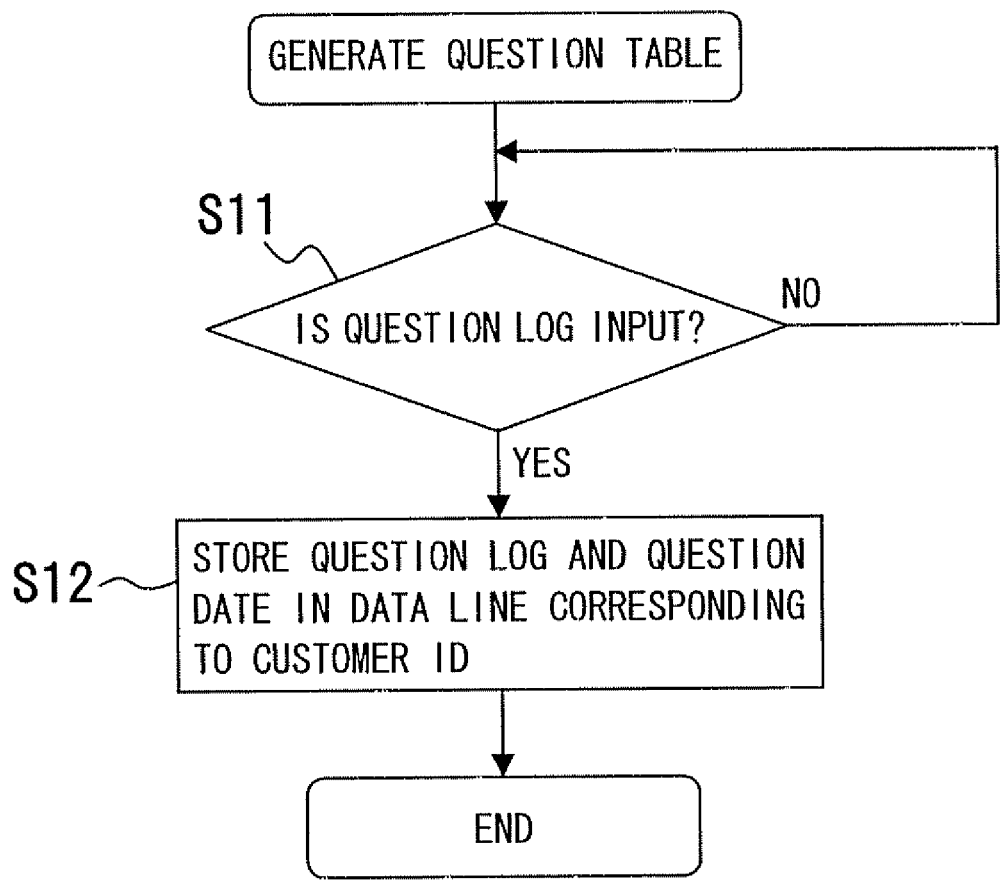
FIG. 6 is a flowchart of a processing procedure of a generation process of a question table.

Description will be made of the data generation in the question table 262 with reference to FIGS. 6 and 7. FIG. 6 is a flowchart of a processing procedure of a generation process of the question table 262 and FIG. 7 shows an example of the question table 262.

The data in the question table 262 are generated when the customer 8 sends question the call center 4. In this generation process, as shown in FIG. 6, input of a question log is monitored (step S11), and if the question log is input (YES at step S11), the question log and a question date are stored in a data line corresponding to the customer ID (step S12) and this process is terminated. The question date is a date when an operator of the call center 4 receives the question.

As shown in an example of FIG. 7, a data line is set for each customer ID in the question table 262, and question content and the question date are registered in each data line.

(3) Data Generation in Marketing Period Table 263

Figure 8:
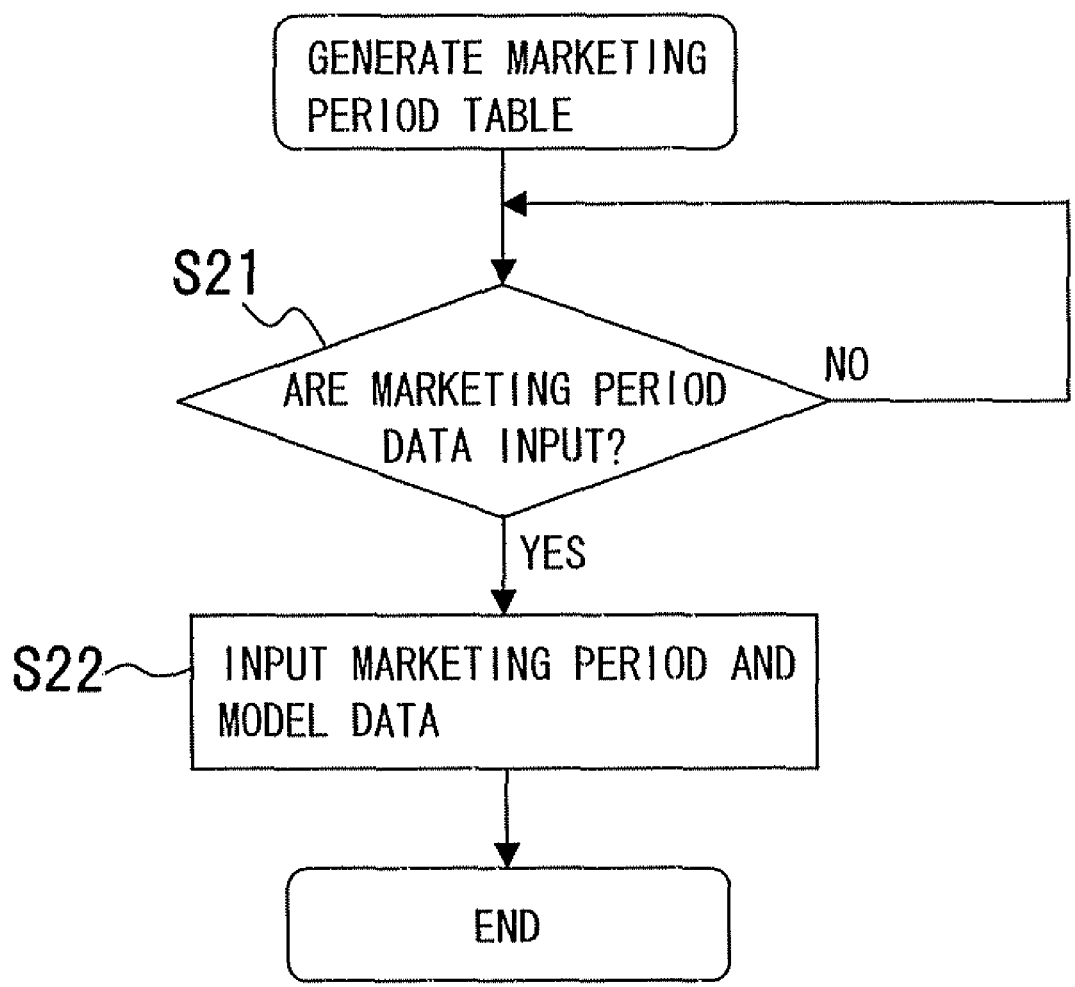
FIG. 8 is a flowchart of a processing procedure of a generation process of a marketing period table.

Description will be made of the data generation in the marketing period table 263 with reference to FIGS. 8 and 9. FIG. 8 is a flowchart of a processing procedure of a generation process of the marketing period table 263 and FIG. 9 shows an example of the marketing period table 263.

The marketing period table 263 receives input of model data generated for each marketing period and released in that marketing period. In this generation process, as shown in FIG. 8, input of marketing period data is monitored (step S21), and if the marketing period data is input (YES at step S21), the marketing period data and the model data are stored such as a model name and a marketing period corresponding to the model ID representing the released equipment (step S22) and this process is terminated.

In the marketing period table 263, as shown in an example of FIG. 9, the model name, marketing period, CPU, HDD capacity, etc. are registered in a data line set for each model ID.

(4) Tabulation Process

Figure 10:
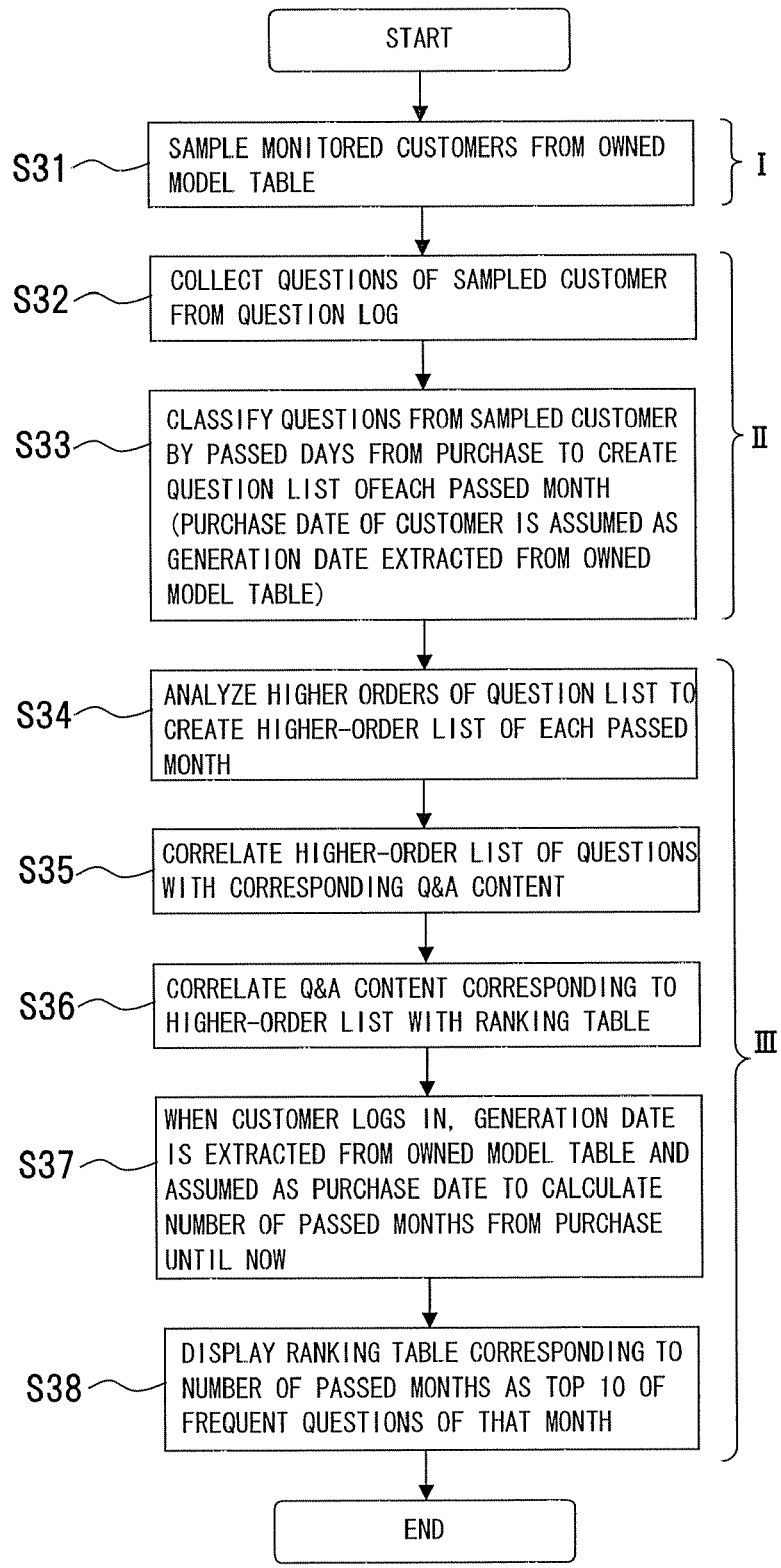
FIG. 10 is a flowchart of a processing procedure of a tabulation process.
Figure 11:
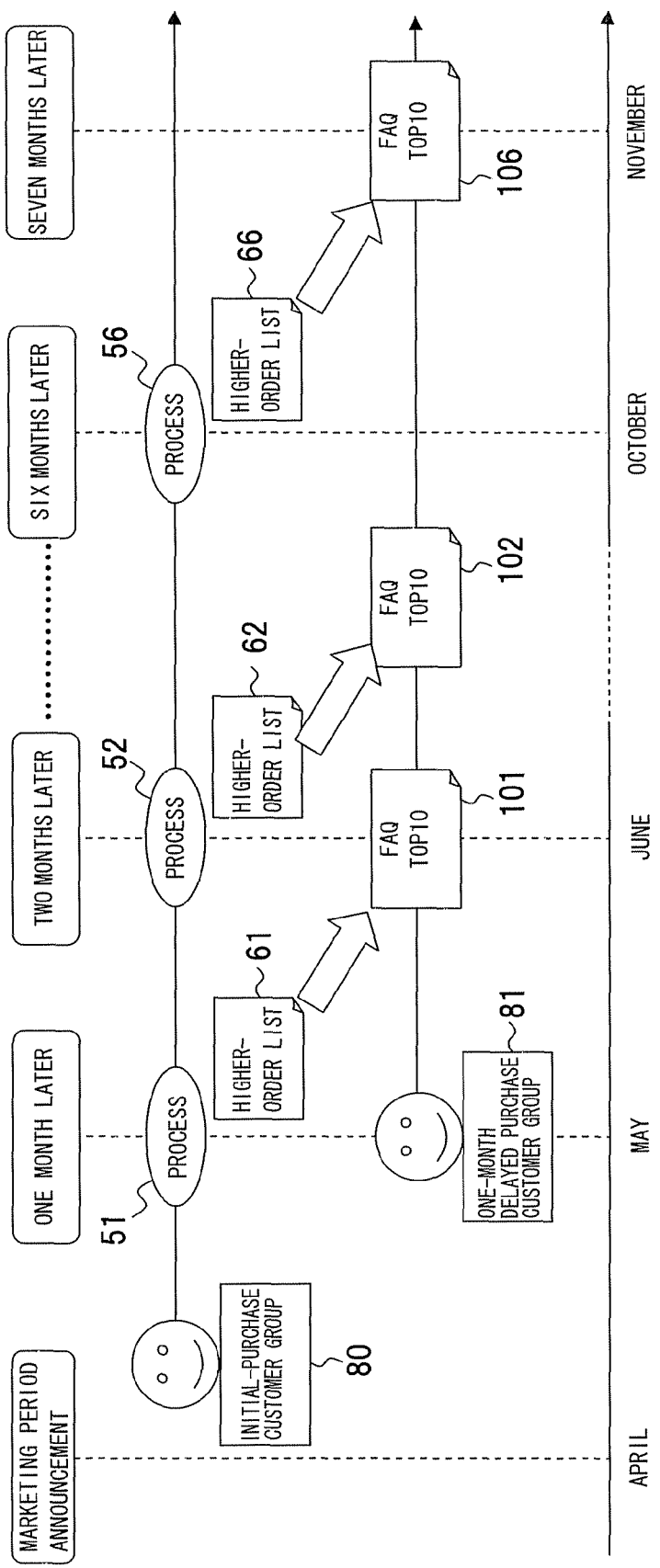
FIG. 11 shows processing contents of the tabulation process.
Figure 12:
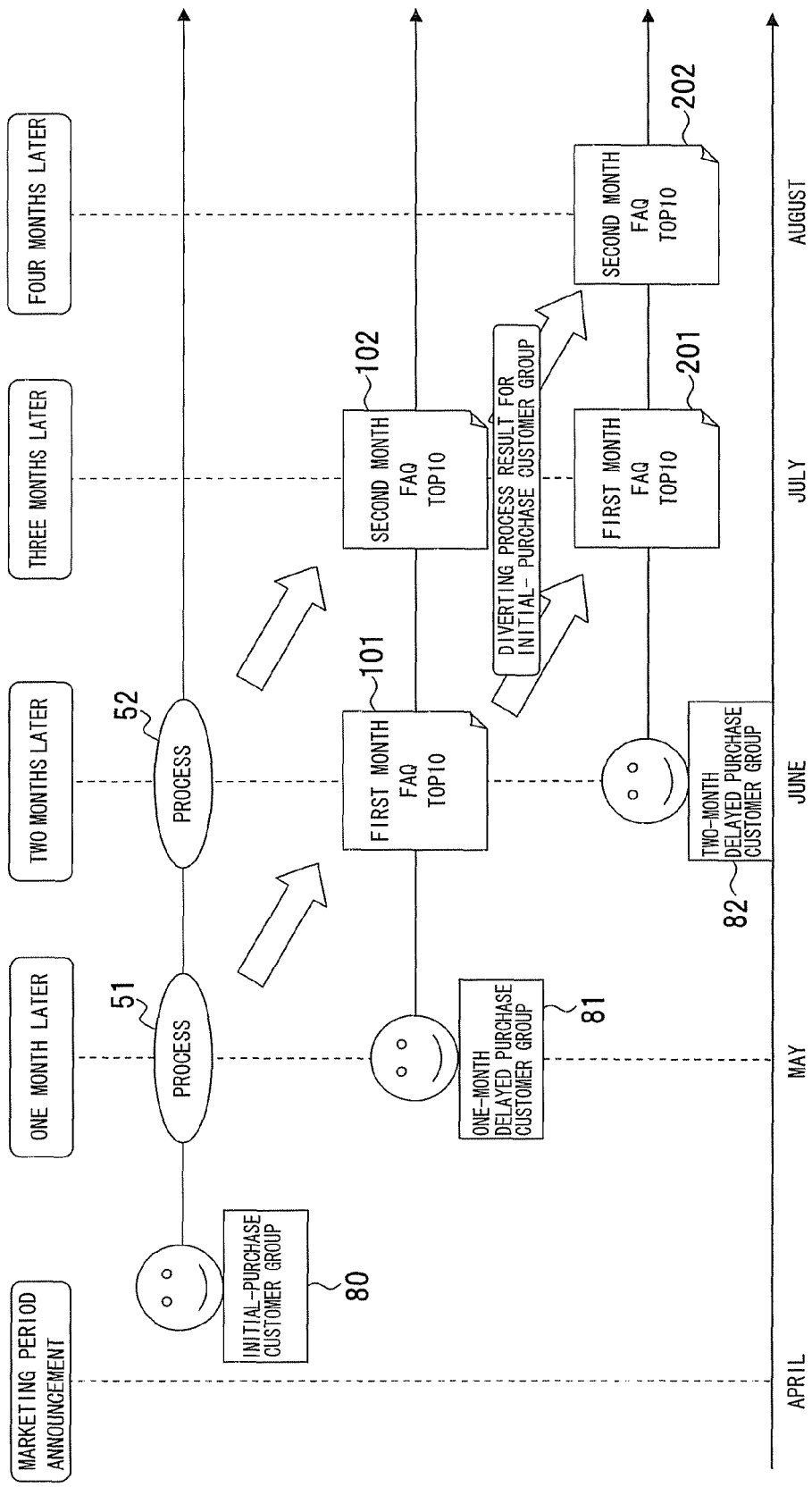
FIG. 12 shows processing contents of the tabulation process.

Description will be made of the tabulation process with reference to FIGS. 10, 11, and 12. FIG. 10 is a flowchart of a processing procedure of the tabulation process and FIGS. 11 and 12 show processing contents.

In this tabulation process, a customer sampling process I, a question list generation process II, and a ranking determination process III are performed stepwise. In this tabulation process, the monitored customers 8 are sampled from the owned model table 261 (step S31); questions of the sampled customers are collected from the question log (step S32); the question of the sampled customer is classified by the passed days from the equipment purchase to create a question list of each passed month (step S33). With regard to a purchase date, the generation date extracted from the owned model table 261 may be assumed as the purchase date.

Higher orders of the question list are analyzed to create a higher-order list of each passed month (step S34); the higher-order list of the questions is correlated with corresponding classifying items, for example, Q&A contents (step S35); and the Q&A contents corresponding to the higher-order list are correlated with the ranking table 265 and stored (step S36).

The customer 8 logs into the tabulation processing apparatus 6 from a web site established on the network 12; the generation date is extracted from the owned model table 261 and is assumed as the purchase date; the number of the passed months from the purchase date to the current date are calculated (step S37); and the ranking table 265 corresponding to the number of the passed months is displayed as the top 10 of frequent questions of that month on a web site (e.g., a Q&A navi) (step S38). This display is deployed on the displaying unit 31 of the information processing terminal 10 and the customer 8 can acquire information such as an answer to the question.

With regard to this tabulation process, for example, FIG. 11 shows the process from a marketing period announcement in April to November and the tabulation process is performed for each month. In this case, for a customer group 80 related to initial purchase in one month after the marketing period announcement, a tabulation process 51, a tabulation process 52, and a tabulation process 56 are performed after one month, two months, and six months from the marketing period announcement, and a higher-order list 61, a higher-order list 62, respectively, and a higher-order list 66 are created in the tabulation process 51, the tabulation process 52, and the tabulation process 56, respectively.

On the other hand, for questions from a customer group 81 related to one-month delayed purchase, a process result 101 is published by diverting the higher-order list 61 of the tabulation process 51. That is, the questions are tabulated by the elapsed time from each time point of purchase in common for the initial purchase customer group 80 and the one-month delayed purchase customer group 81; a process result after two months is published as a process result 102 after three months; and a process result after six months is published as a process result 106 after seven months.

In FIG. 12, a customer group 82 related to two month delayed purchase is added to this tabulation process. In FIG. 12, the same numerals are added to the same portions as FIG. 11. A process result 201 of a first month for the customer group 82 is published after three months and a process result 202 of a second month is published after four months. In this case, the process result 101 of the initial purchase customer group 80 is diverted to the process result 201, and the process result 102 of the initial purchase customer group 80 is diverted to the process result 202. By diverting in this way, the question information for the two-month delayed purchase customer group 82 reflects question information that may be generated under the same condition, and useful solution information can be provided for various questions to improve the service.

Figure 13:
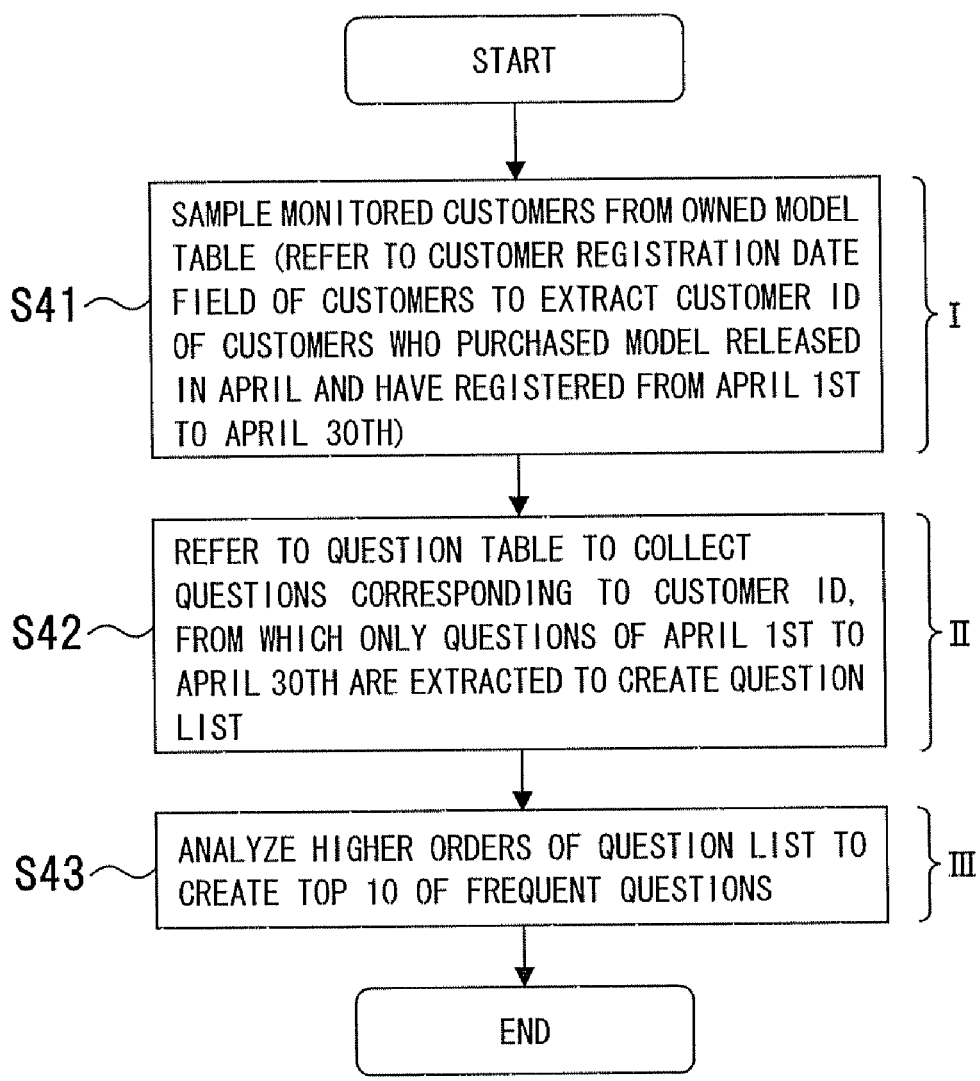
FIG. 13 is a flowchart of a processing procedure of the tabulation process.

Description will be made of a process that performs the tabulation process for a single month to create the ranking of the first month after the purchase in this embodiment with reference to FIG. 13. FIG. 13 is a flowchart of a processing procedure of the tabulation process.

In this processing procedure, as shown in FIG. 13, the monitored customers 8 are sampled from the owned model table 261 in the customer sampling process I (step S41). In the process at the step S41, the registration dates of the customers 8 and the customer registration date field of the owned model table 261 are referenced to extract the customer ID of the customers 8 who purchased the model released in April and have registered in a period from April 1st to April 30th in the example above (FIG. 11). The output data of the customer sampling process I are the input data of the question list generation process II.

In the question list generation process II, the question table 262 is referenced to collect questions for the customer ID, and questions for one month are extracted from the questions to create a question list for one month (step S42). In this case, questions are extracted for the customers 8 who have registered in a period from April 1st to April 30th in the example above (FIG. 11). The output data of the question list generation process II are the input data of the ranking determination process III.

In the ranking determination process III, the question group is input and the most frequent questions are drawn and output from the question group using the analysis of the higher orders (step S43). That is, the higher orders of the question list are analyzed to create the top 10 representing the ranking result of the frequent questions.

If the tabulation process for a single month is performed to acquire the ranking of, for example, the first month after the purchase of the models released in April, when inputting, for example, a list of the models released in April, a period of the customer registration dates (April 1st to April 30th), and a specified period, i.e., the first month after the purchase, the top 10 questions are output as the result of the ranking determination process of the most frequent questions of the first month by performing the customer sampling process I, the question list generation process II, and the ranking determination process III, as described above.

Figure 14:
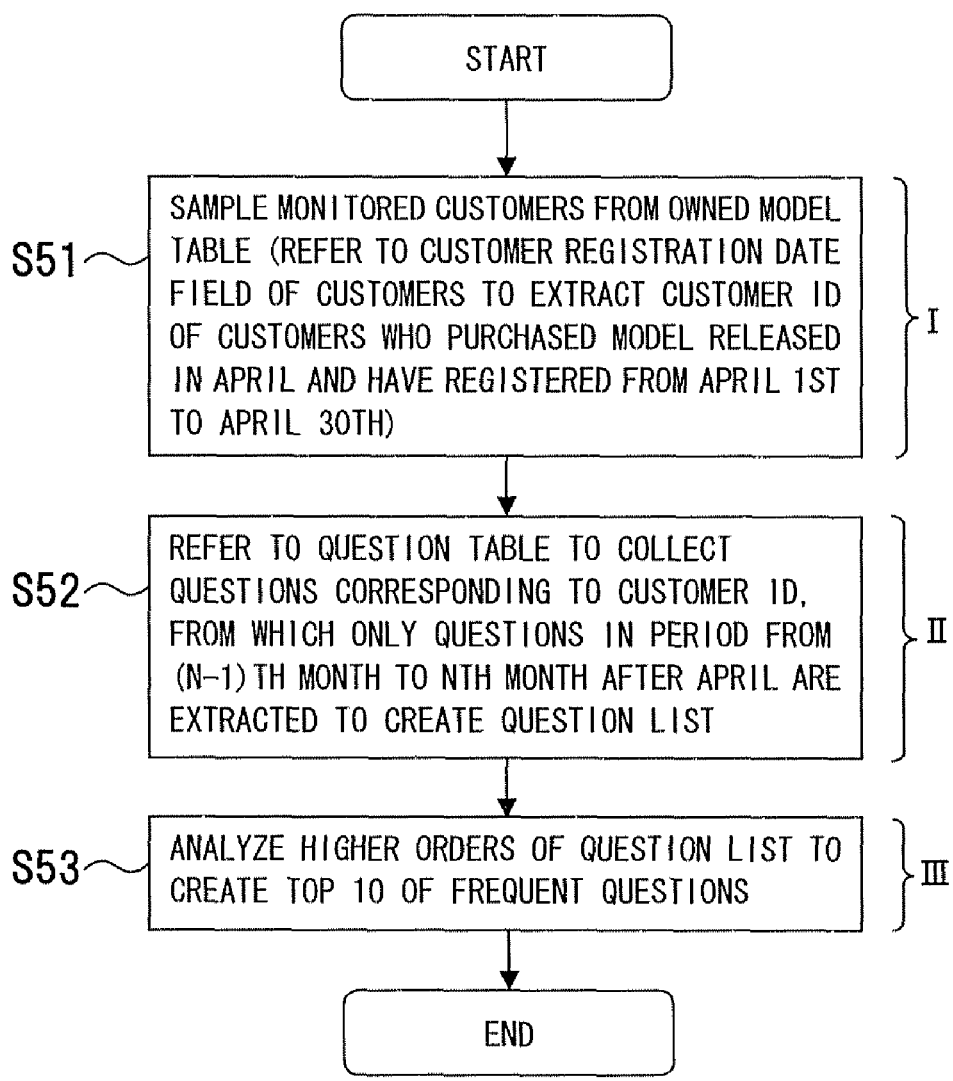
FIG. 14 is a flowchart of a processing procedure of the tabulation process.

In such a tabulation process for each single month, the ranking determination process may be performed for the Nth month after the purchase. FIG. 14 is a flowchart of a processing procedure of the tabulation process in this case.

In this processing procedure, as shown in FIG. 14, the monitored customers 8 are sampled from the owned model table 261 in the customer sampling process I (step S51). In the process at the step S51, the registration dates of the customers 8 and the customer registration date field of the owned model table 261 are referenced to extract the customer ID of the customers 8 who purchased the model released in April and have registered in a period from April 1st to April 30th in the example above (FIG. 11).

In the question list generation process II, the question table 262 is referenced to collect questions for the customer ID, and questions of the Nth month are extracted from the questions to create a question list for the Nth month (step S42). In this case, the question list is created by extracting questions sent in a period from (N−1)th month to Nth month after April in the example above (FIG. 11).

In the ranking determination process III, the question group is input and the most frequent questions are drawn and output from the question group using the analysis of the higher orders (step S43). That is, the higher orders of the question list are analyzed to create the top 10 representing the ranking result of the frequent questions.

In such a process, for example, when inputting a list of the models released in April, a period of the customer registration dates, for example, a period from April 1st to April 30th, and a specified period, for example, the first Nth month after the purchase, the top 10 questions are output as the result of the ranking determination process of the most frequent questions of the Nth month after the purchase.

Second Embodiment

Figure 15:
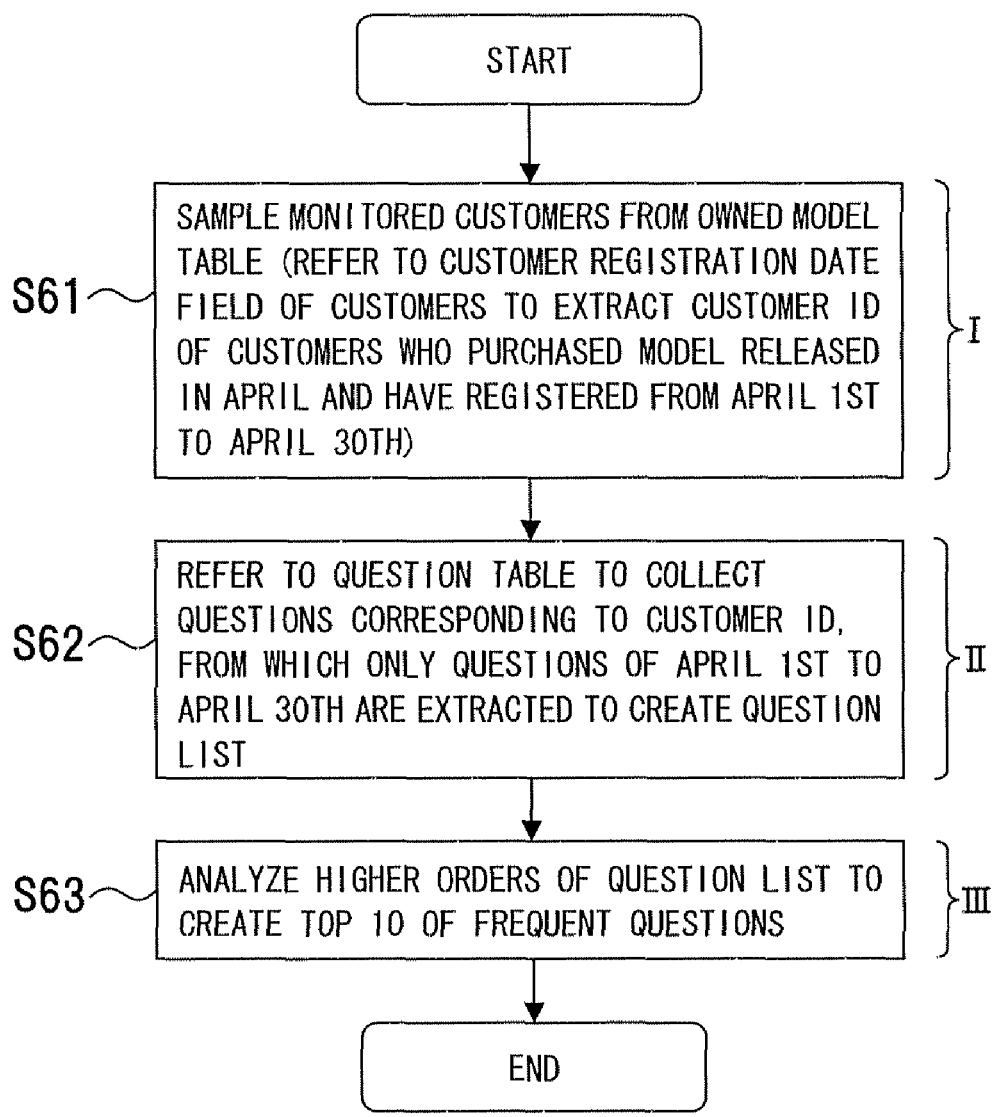
FIG. 15 is a flowchart of a tabulation processing procedure according to a second embodiment.
Figure 16:
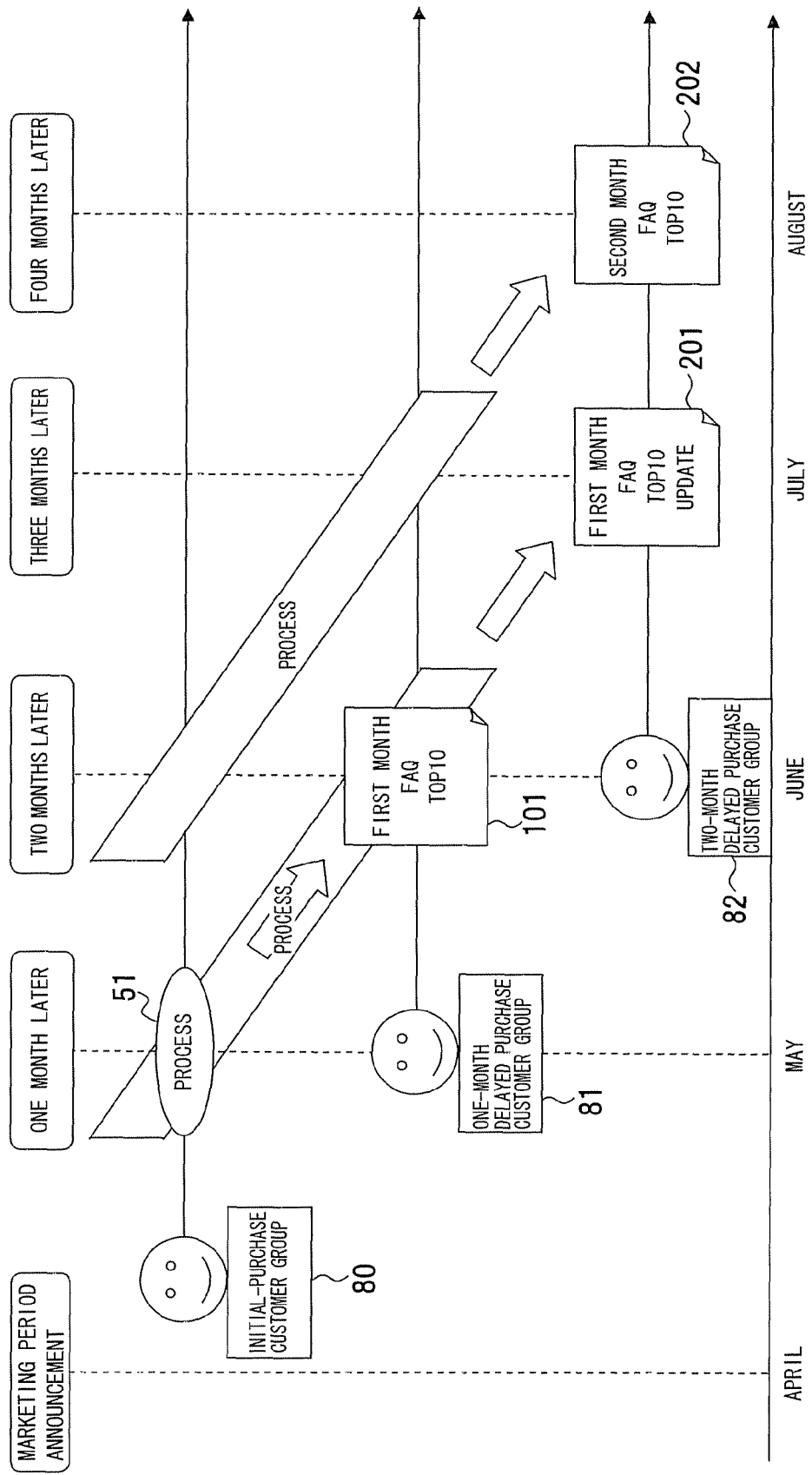
FIG. 16 shows a tabulation process.
Figure 17:
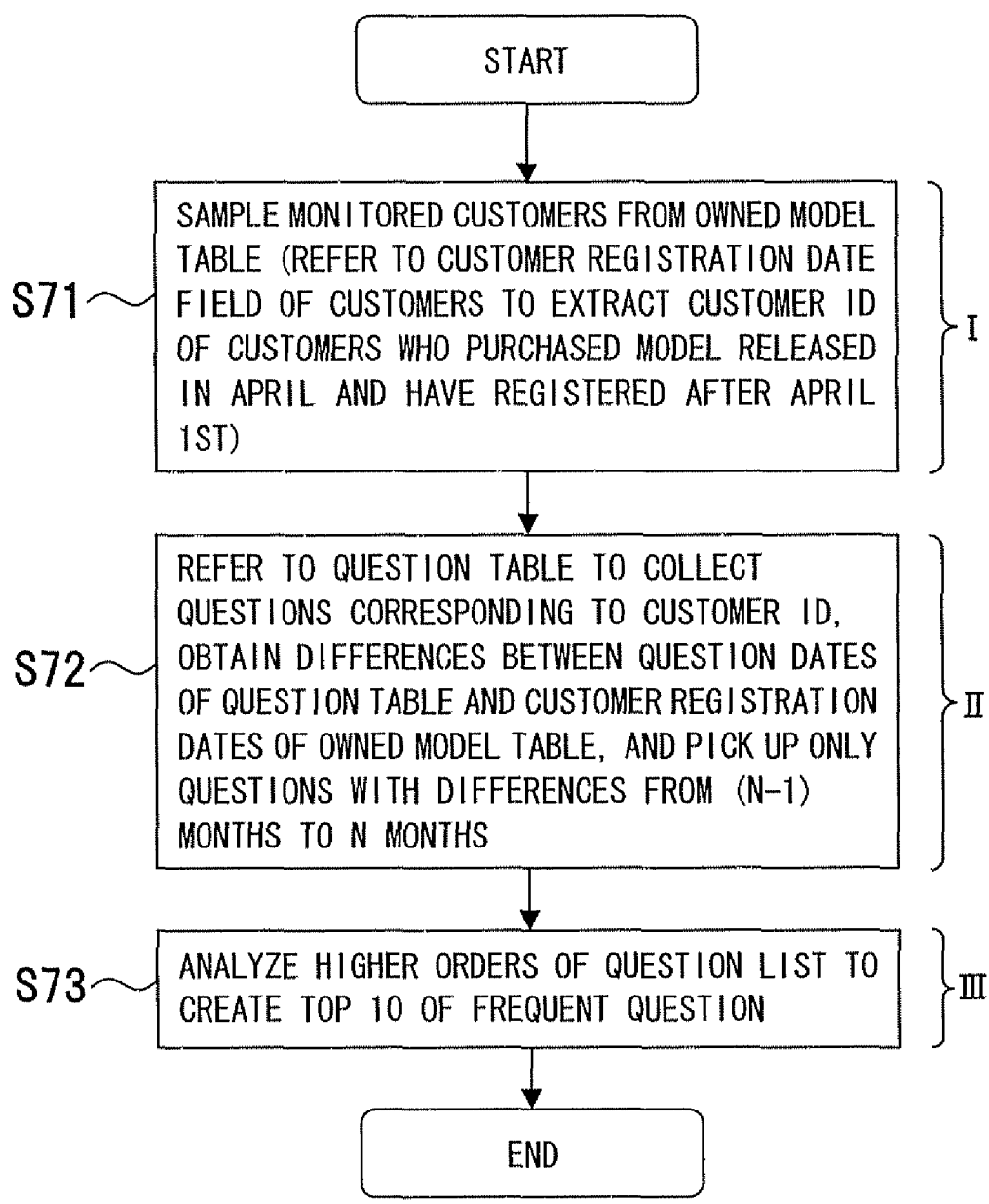
FIG. 17 is a flowchart of another tabulation process procedure.

A second embodiment of the present invention will be described with reference to FIGS. 15, 16, and 17. FIG. 15 is a flowchart of a processing procedure for performing a tabulation process of a plurality of months; FIG. 16 shows the tabulation process; and FIG. 17 is a flowchart of another tabulation process procedure. In FIG. 16, the same numerals are added to the same portions as FIGS. 11 and 12.

This embodiment also uses the tabulation processing system 2 shown in FIG. 1, the DB server 14 shown in FIG. 2, the process contents shown in FIG. 3, and the process of FIGS. 4 to 9.

The tabulation process of this embodiment is a process when a tabulation process is performed for a plurality of months to create a ranking result of the first month. As shown in FIG. 15, this process procedure creates the ranking of the first month after the purchase of the model released in April, and the monitored customers 8 are sampled from the owned model table 261 in the customer sampling process I (step S61). In the process at the step S51, the registration dates of the customers 8 and the customer registration date field of the owned model table 261 are referenced to extract the customer ID of the customers 8 who purchased the model released in April and have registered in a period from April 1st to April 30th, for example.

In the question list generation process II, the question table 262 is referenced to collect questions for the customer ID, and questions for one month are extracted from the questions to create a question list for one month (step S62). In this case, questions registered in a period from April 1st to April 30th are extracted to create the question list.

In the ranking determination process III, the question group is input and the most frequent questions are drawn and output from the question group using the analysis of the higher orders (step S63). That is, the higher orders of the question list are analyzed to create the top 10 representing the ranking result of the frequent questions.

In such a process, for example, when inputting a list of the models released in April and a specified period, for example, the first month after the purchase, the top 10 are output as the ranking result of the most frequent questions of the first month.

With regard to this tabulation process, for example, FIG. 16 shows the process from a marketing period announcement in April to August and the tabulation process is performed for a plurality of months, i.e., two months. In this case, for the customer group 80 related to initial purchase in one month after the marketing period announcement, the tabulation process 51 is performed after one month from the marketing period announcement.

On the other hand, for questions from the customer group 81 related to one-month delayed purchase, the tabulation process is performed after one month (in June), and this tabulation process reflects the process result of the initial purchase customer group 80. For questions from the customer group 82 related to two-month delayed purchase, the tabulation process is performed after one month (in July), and the process result of the customer group 80 and a process result 101 of the customer group 81 are updated with the question tabulation result of the customer group 82 and are published as a process result 201. Similarly, a process result 202 is published after one month from the process result 201 (in August). That is, the data of the one-month delayed purchase customer group 81 are added to the data of the initial purchase customer group 80 to update the first month process result 201 referenced by the two-month delayed purchase customer group 82. The process result 201 of the questions from the two-month delayed purchase customer group 82 reflects the result of the tabulation process 51 of the initial-purchase customer group 80 and the process result 101 of the one-month delayed purchase customer group 81, and the two-month delayed purchase customer group 82 can reference the useful question information of the preceding customer groups 80, 81.

In such a tabulation process for a plurality of months, the ranking determination process may be performed for the Nth month after the purchase as shown in FIG. 17.

In this processing procedure, as shown in FIG. 17, the monitored customers 8 are sampled from the owned model table 261 in the customer sampling process I (step S71). In the process at the step S71, the registration dates of the customers 8 and the customer registration date field of the owned model table 261 are referenced to extract the customer ID of the customers 8 who purchased the model released in April and have registered after April 1st in the example above (FIG. 16).

In the question list generation process II, the question table 262 is referenced to collect questions for the customer ID; differences are obtained between the question dates of the question table 262 and the customer registration date of the owned model table 261; and a question list is created by extracting questions with the differences from (N−1) months to N months (step S72). In this case, the question list is created by extracting questions sent in a period from (N−1)th month to Nth month after April in the example above (FIG. 16).

In the ranking determination process III, a question list is drawn out and output using the analysis of the higher orders (step S73). That is, the higher orders of the question list are analyzed to create the top 10 representing the ranking result of the frequent questions.

In such a process, the top 10 are output as the ranking result related to the list of the models released in April and the most frequent questions of a specified period after the purchase, for example, the Nth month after the purchase in April.

Third Embodiment

Figure 18:
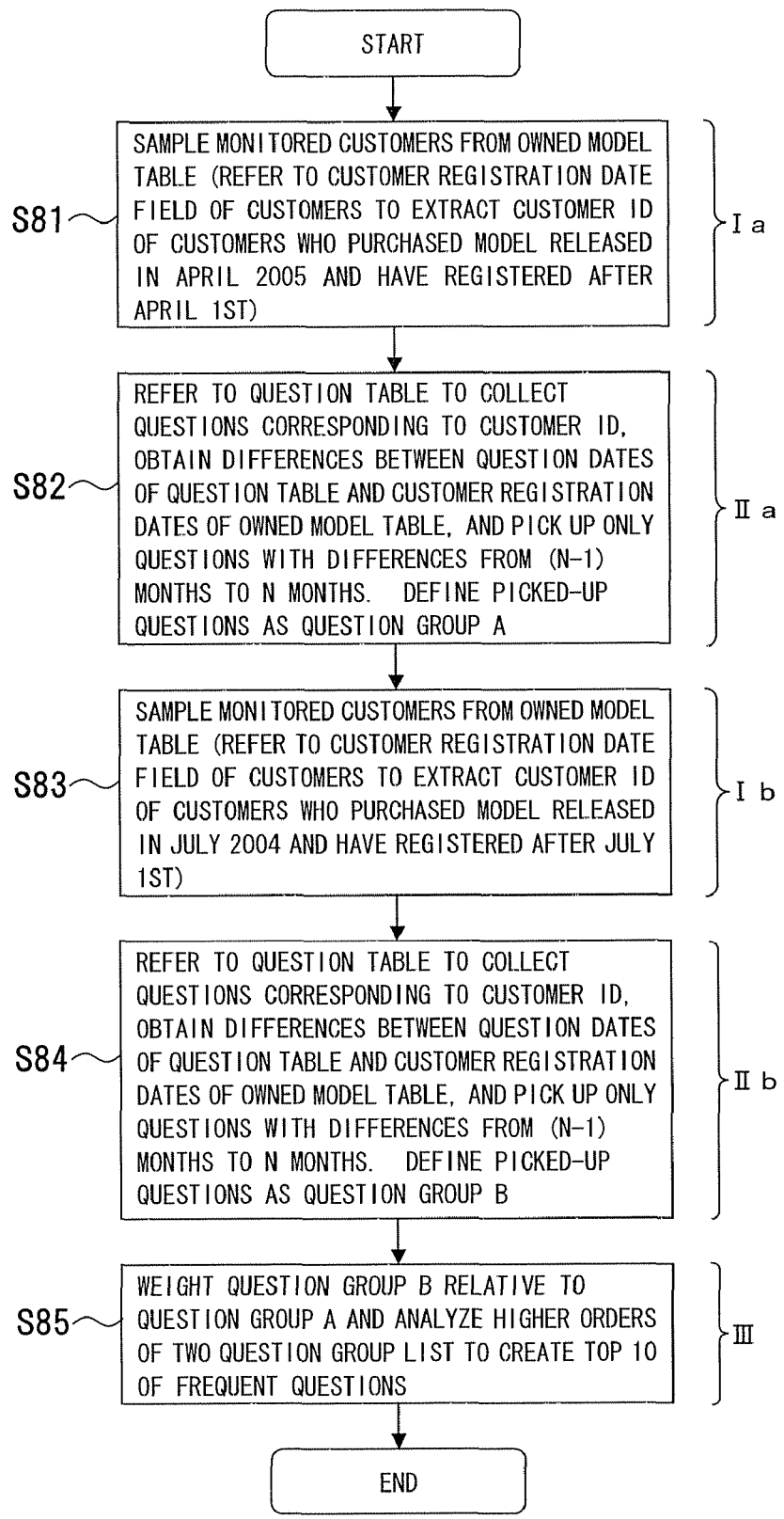
FIG. 18 is a flowchart of processing procedure of a tabulation process according to a third embodiment.

A third embodiment of the present invention will be described with reference to FIG. 18. FIG. 18 is a flowchart of a processing procedure of the tabulation process according to the third embodiment.

This embodiment also uses the tabulation processing system 2 shown in FIG. 1, the DB server 14 shown in FIG. 2, the process contents shown in FIG. 3, and the process of FIGS. 4 to 9.

The process of this embodiment is a tabulation process across marketing periods as well as a plurality of months and, by way of example, a process shown in FIG. 18 is an example of creating the ranking of the Nth month after the purchase of the model released in April. In this case, for example, a model released in the marketing period is a model released in April 2005 and a model released in the preceding marketing period is a model released in July 2004.

In this process, the monitored customers 8 are sampled from the owned model table 261 in a first customer sampling process Ia (step S81). At step S81, the customer registration date field of the owned model table 261 is referenced to extract the customer ID of the customers who purchased the model released in April 2005 and have registered after April 1st, for example.

In a first question list generation process IIa, the question table 262 is referenced to collect questions corresponding to the customer ID, and differences are obtained between the question dates of the question table 262 and the customer registration date of the owned model table 261 to pick up questions with the differences of (N−1) months to N months (step S82) only. A group of the picked-up questions is defined as a question group A.

In a second customer sampling process Ib, the monitored customers 8 are sampled from the owned model table 261 (step S83). At step S83, the customer registration date field of the customers 8 is referenced to extract the customer ID of the customers who purchased the model released in July 2004 and have registered after July 1st, for example.

In a second question list generation process IIb, the question table 262 is referenced to collect questions corresponding to the customer ID, and differences are obtained between the question dates of the question table 262 and the customer registration date of the owned model table 261 to pick up questions with the differences of (N−1) months to N months (step S84). A group of the picked-up questions is defined as a question group B.

In the ranking determination process III, after the question group B is weighted relative to the aforementioned question group A, higher orders of two question group list are analyzed to create the top 10 representing a result of the ranking from the most frequent question (step S85). That is, the question group of the current marketing period and the question group of the previous marketing period are input; two question groups are weighted and combined to form a single question group; and the most frequent questions are drawn and output from the question group by analyzing the higher orders.

This process is constituted by the first and second customer sampling processes Ia, Ib, the first and second question list generation process IIa, IIb, and the ranking determination process III and, in this process, for example, when inputting a list of the models released in April, a list of the models of the previous marketing period, a specified period after the purchase (in this case, N months), and the weight of the previous marketing period, the process output, i.e., the top 10 are output as the result of the ranking determination process of the most frequent questions of the Nth month after the purchase.

Figure 19:
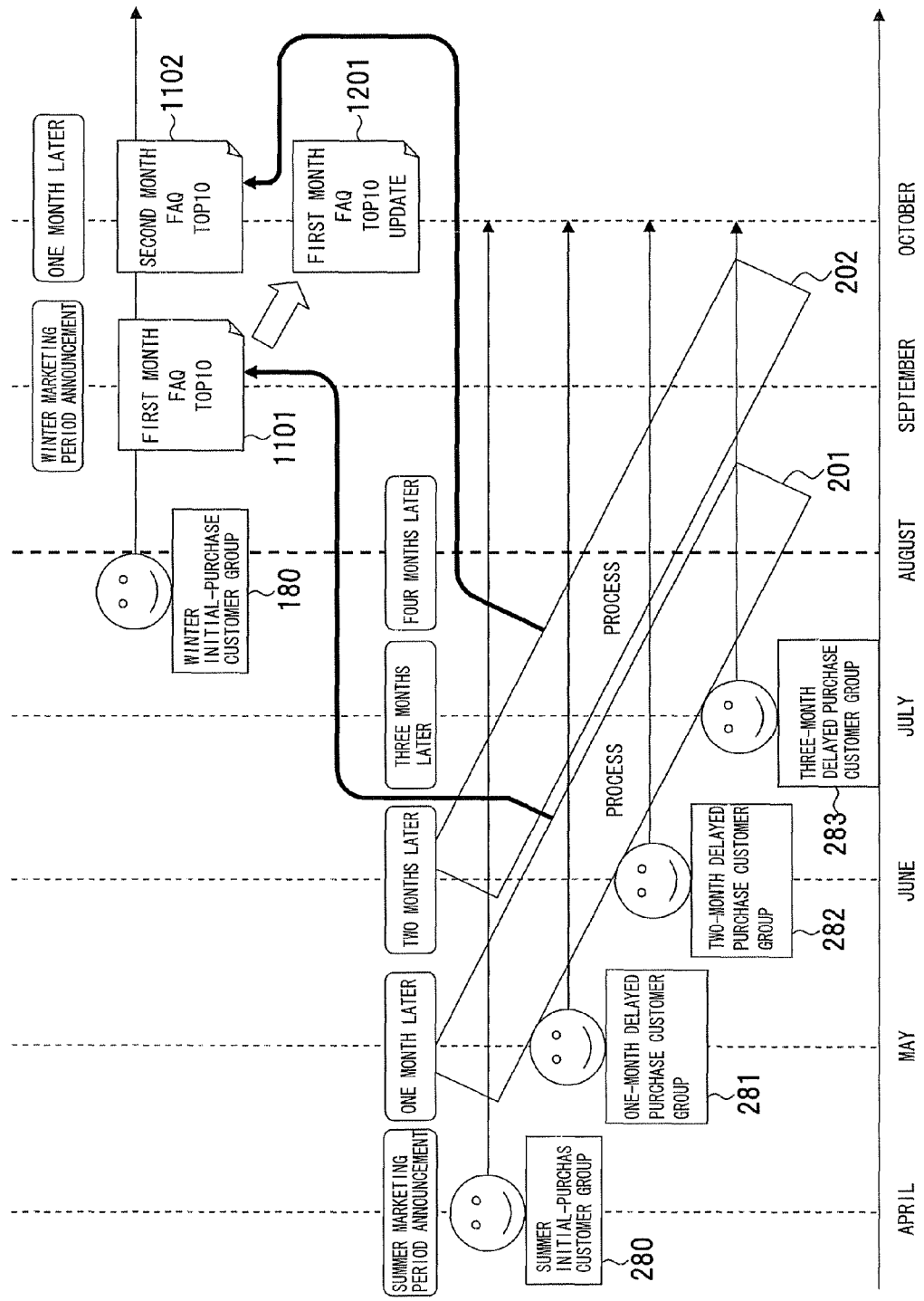
FIG. 19 shows a tabulation process.
Figure 20:
FIG. 20 shows the ranking display of the tabulation process.
Figure 21:
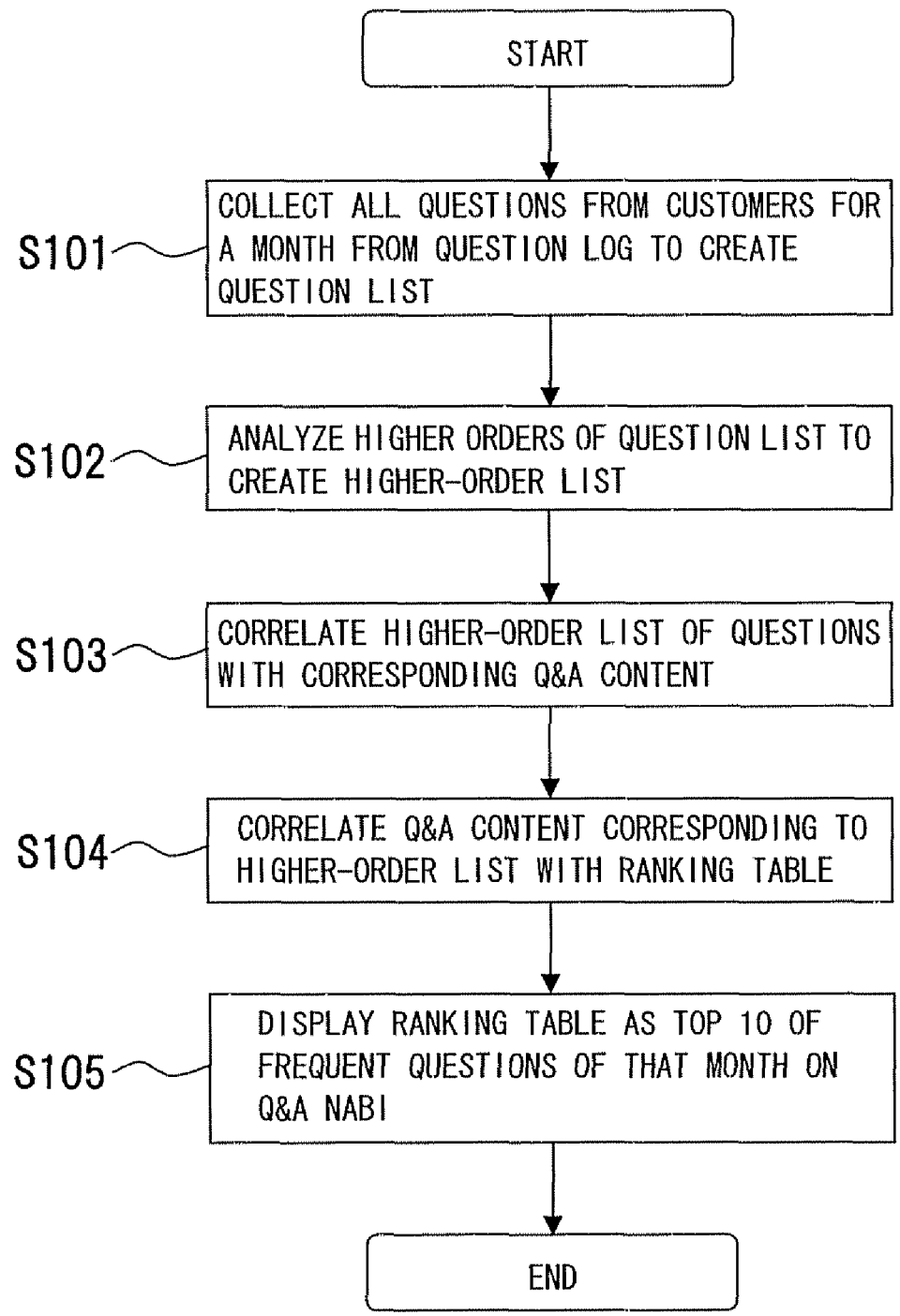
FIG. 21 is a flowchart of a processing procedure of a conventional tabulation process.
Figure 22:
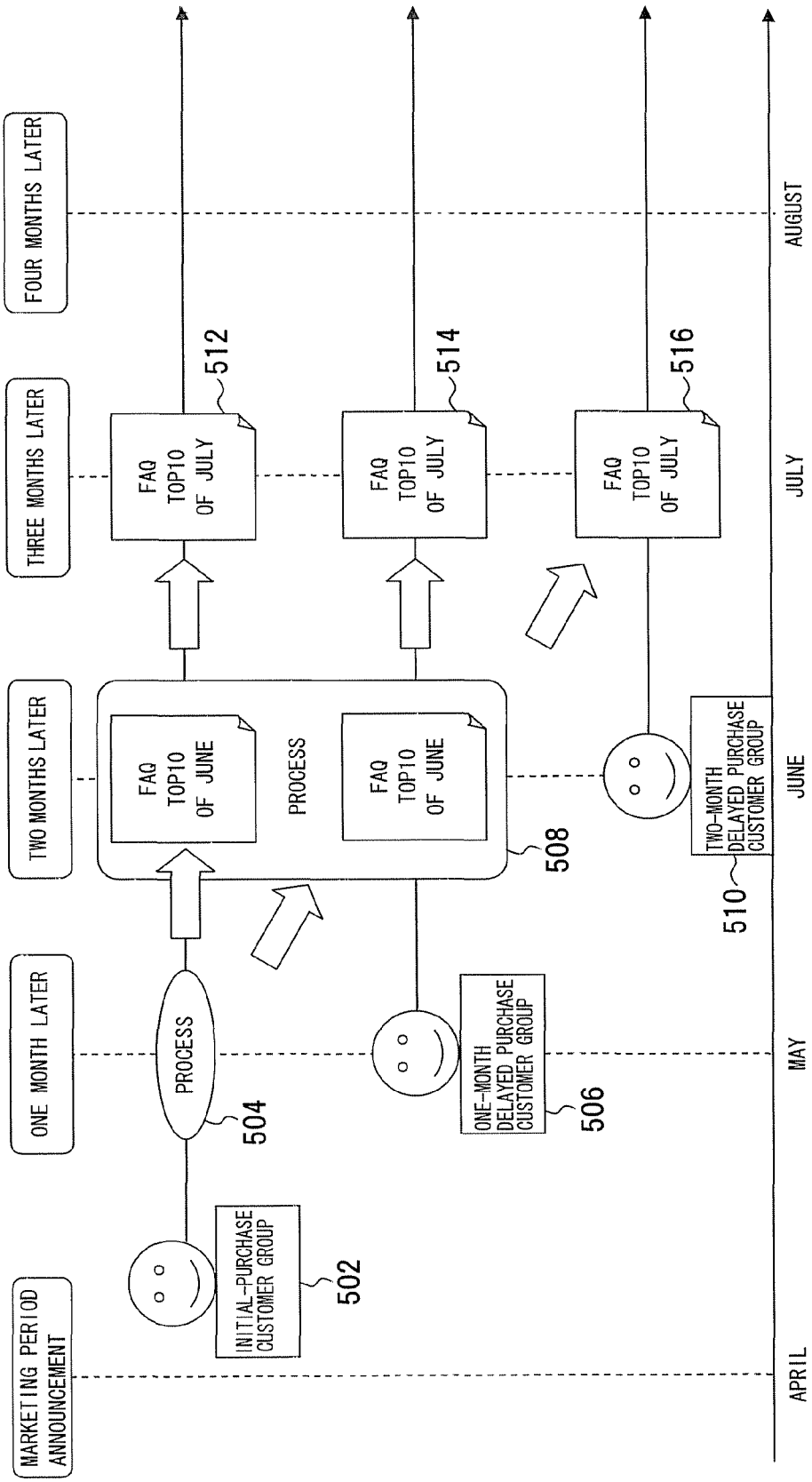
FIG. 22 shows a process of the conventional tabulation process.

Referring to FIG. 19 to describe the tabulation process across the marketing periods as well as a plurality of months, questions of a summer marketing period are weighted and reflected in questions of a winter marketing period in two marketing periods of the process shown in FIG. 19. In this case, the tabulation processes in the summer marketing period are performed for a customer group 280 related to summer initial purchase, a customer group 281 related to one-month delayed purchase, a customer group 282 related to two-month delayed purchase, and a customer group 283 related to three-month delayed purchase to publish a ranking determination process result 201 after one month and a ranking determination process result 202 after two months from the summer marketing period announcement.

Correspondingly, a tabulation process is performed for a customer group 180 related to winter initial purchase of the winter marketing period announcement. Since a tabulation process 1101 is a process of the first month after the purchase and a tabulation process 1102 is a process of the second month after the purchase, the tabulation process 1101 reflects the weighted ranking determination process result 201 of the first month of the passed marketing period corresponding to the elapsed time, and the tabulation process 1102 reflects the weighted ranking determination process result 202 of the second month of the passed marketing period corresponding to the elapsed time.

In such a tabulation process, the questions are tabulated correspondingly to the elapsed time to publish the top 10 as the ranking determination process result, and each customer can check the question contents having the common elapsed time from the equipment purchase to acquire useful solution information for problems. Especially, although less question information can be presented to the customers related to the initial purchase and the customers related to one-month delayed purchase, the accurate solution information can be presented by referring to the result of the previous marketing period and, particularly, after a default value of two months has elapsed, accuracy is increased in the information presented for the questions.

Other Embodiments

With regard to the embodiments described above, modifications, etc. will be listed and described.

(1) Customer Registration Date

Although the customer registration dates are different among the customers, when assuming a plurality of questions, differences in the number of days are within an error range from a viewpoint of the transition of the question contents. Therefore, the customer registration date may be a purchase date, and the usage start date, etc. may be input as the purchase timing to a customer information input screen.

(2) Tabulation Processing Apparatus 6

Although the DB server 14 and the information processing terminals 21 to 23 are configured separately and linked with the bus 24 in the above embodiments, a single computer may constitute the storing unit that constitutes the database and the processing unit that performs the tabulation process.

(3) Application of Tabulation Process

Although merchandise purchase is illustrated and described in the above embodiments, the present invention can be applied to various call center tabulation processes, etc. intended for the case that the learning level and the question contents change depending on elapsed time from a point of generation of an event, such as a process of questions from patients at hospitals and a process of questions to various schools from new students.

According to the present invention, a tabulation result can be acquired correspondingly to changes in questions based on the knowledge that the question contents are changed as time advances from a point of generation of a cause of the question, and since the questions are tabulated and ranked correspondingly to the elapsed time from an event such as the equipment purchase, the present invention beneficially contributes to presentation of useful solution information for the questions.

While the illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A tabulation processing apparatus that tabulates and ranks a plurality of questions, comprising:
   a storage device that stores a question group constituted by a plurality of questions that are issued from customers; and
   a central processing unit that extracts questions from the question group stored in the storage device for each elapsed time period to create a question list, the elapsed time period being a time period from a reference time point of each question to a generation time point thereof, the central processing unit classifying and ranking the questions of the question list;
   wherein the central processing unit outputs ranking information corresponding to a period with the use of the ranking of the questions, the period being from the reference time point to the generation time point of the question, based on the input of the reference time point, and
   the central processing unit tabulates a question having an earlier reference time point and a question having a later reference time point which have the elapsed time period in common, and creates the question list, which includes questions having the common elapsed time period from the reference time point of each question, for each elapsed time period.

2. The tabulation processing apparatus of claim 1, wherein the processing circuit extracts the questions from the question group depending on the customers to create the question list.

3. The tabulation processing apparatus of claim 1, further comprising:
   a reference information storage device that stores reference information referred for the ranking, wherein the processing circuit refers to the reference information of the reference information storage device to perform the ranking.

4. A tabulation processing method executed in an apparatus, that tabulates and ranks a plurality of questions, the tabulation processing method comprising:
   extracting by a processing circuit in the apparatus questions for each elapsed time period from a question group constituted by a plurality of questions that are issued from customers to create a question list, the elapsed time period being a time period from a reference time point of each question to a generation time point thereof;
   classifying and ranking by the processing circuit the questions of the question list; and
   outputting by the processing circuit ranking information corresponding to a period with the use of the ranking of the questions, the period being from the reference time point to the generation time point of the question, based on the input of the reference time point, wherein the question list is created for each elapsed time period by tabulating a question having an earlier reference time point and a question having a later reference time point which have the elapsed time period in common, and includes questions having the common elapsed time period from the reference time point of each question.

5. The tabulation processing method of claim 4, further comprising:

creating by the processing circuit the question group from a plurality of questions.

6. The tabulation processing method of claim 4, further comprising:

extracting by the processing circuit the questions from the question group depending on the customers to create the question list.

7. A non-transitory computer readable recording medium having a program executable by a computer to tabulate and rank a plurality of questions embodied therein, the program making the computer execute:

extracting by a processing circuit in the computer questions for each time period from a question group that includes a plurality of questions issued from customers, the time period elapsing from a reference time point of the questions to a generation time point of each question, the reference time point being set based on generation of an event which is a cause of each question;

tabulating by the processing circuit a question having an earlier reference time point and a question having a later reference time point which have the elapsed time period in common, and creating a question list, which includes questions having the common elapsed time period from the reference time point of each question, for each elapsed time period; and classifying and ranking by the processing circuit the questions of the question list.

8. The non-transitory computer readable recording medium of claim 7, the program making the computer execute:

creating by the processing circuit the question group from a plurality of questions.

9. The non-transitory computer readable recording medium of claim 7, the program making the computer execute:

extracting by the processing circuit the questions from the question group depending on the customers to create the question list.

10. The non-transitory computer readable recording medium of claim 7, the program making the computer execute:

outputting by the processing circuit information representing the ranking based on the input of the reference time point and the generation time point.

11. A tabulation processing system that tabulates and ranks a plurality of questions, comprising:

a processing apparatus including a first processing circuit; and an information output terminal including a second processing circuit and that is connected to the processing apparatus, wherein the first processing circuit extracts questions from a question group constituted by a plurality of questions issued from customers for each elapsed time period to create a question list, the elapsed time period being a time period from a reference time point of each question to a generation time point thereof, the first processing circuit performing processes for classifying and ranking the questions of the question list, and the second processing circuit outputs information representing the ranking, and wherein the processing apparatus outputs ranking information corresponding to a period to the information output terminal with the use of the ranking of the questions, the period being from the reference time point inputted by the information output terminal to a generation time point of the question, and the processing apparatus tabulates a question having an earlier reference time point and a question having a later reference time point which have the elapsed time period in common, and creates the question list, which includes questions having the common elapsed time period from the reference time point of each question, for each elapsed time period.

12. The tabulation processing system of claim 1, wherein the processing apparatus comprises a storage device that stores the question group constituted by a plurality of questions.

13. The tabulation processing system of claim 11, further comprising:

a reference information storage device that stores reference information referred for the ranking, wherein the first processing circuit refers to the reference information of the reference information storage device to perform the ranking.

14. The tabulation processing apparatus of claim 1, wherein the reference time point is set based on generation of an event, which is a cause of the questions; and wherein the created question list includes questions having a common elapsed time from the reference time point.

15. The tabulation processing method of claim 4, wherein the reference time point is set based on generation of an event, which is a cause of the questions; and wherein the created question list includes questions having a common elapsed time from the reference time point.

16. The tabulation processing system of claim 11, wherein the reference time point is set based on generation of an event, which is a cause of the questions; and wherein the created question list includes questions having a common elapsed time from the reference time point.

17. The tabulation processing apparatus of claim 1, wherein the ranking information is the ranking of the questions from the question list.

18. The tabulation processing method of claim 4, wherein the ranking information is the ranking of the questions from the question list.

19. The tabulation processing system of claim 11, wherein the ranking information is the ranking of the questions from the question list.

20. A tabulation processing method executed in an apparatus, that tabulates and ranks a plurality of questions, the tabulation processing method comprising:

extracting by a processing circuit in the apparatus questions, which have a common elapsed time period from a reference time point of each question to a generation time point thereof and relate to a common model of an information processing terminal, from a question group constituted by a plurality of questions that relate to the information processing terminal, to create a question list for each of the questions, which has the common elapsed time period and relates to the common model; and classifying and ranking by the processing circuit the questions of the question list.

* * * * *